J. H. BERRYHILL, F. E. HAND & L. A. THOMAS.
LIFTING MECHANISM FOR PLOWS.
APPLICATION FILED OCT. 23, 1916.
1,222,517.  Patented Apr. 10, 1917.
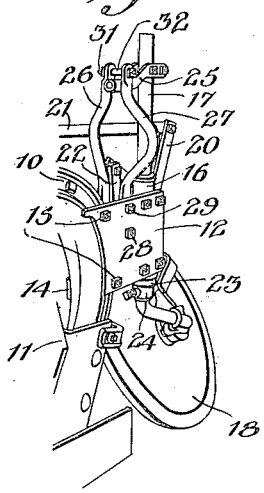
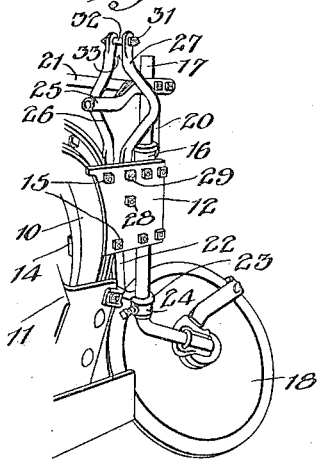
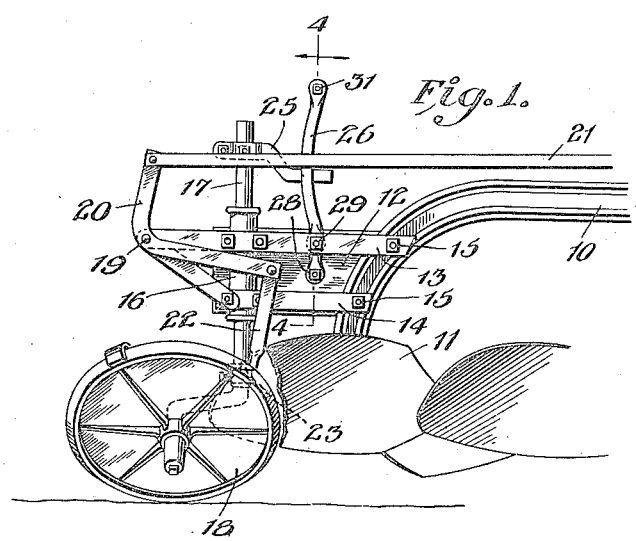
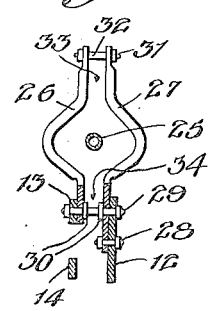
Inventor
John H. Berryhill
Frederick E. Hand
Leslie A. Thomas

UNITED STATES PATENT OFFICE.

JOHN H. BERRYHILL, FREDERICK E. HAND, AND LESLIE A. THOMAS, OF EVANSVILLE, INDIANA, ASSIGNORS TO THE VULCAN PLOW COMPANY, OF EVANSVILLE, INDIANA, A CORPORATION OF INDIANA.

LIFTING MECHANISM FOR PLOWS.

1,222,517.   Specification of Letters Patent.   Patented Apr. 10, 1917.

Application filed October 23, 1916. Serial No. 127,252.

*To all whom it may concern:*

Be it known that we, JOHN H. BERRYHILL, FREDERICK E. HAND, and LESLIE A. THOMAS, citizens of the United States, residing at Evansville, in the county of Vanderburg and State of Indiana, have invented certain new and useful Improvements in Lifting Mechanism for Plows; and we do hereby declare the following to be a full, clear, and exact description of the invention, such as will enable others skilled in the art to which it appertains to make and use the same.

This invention relates to lifts for plows, and has for an object to provide a new mechanical movement applied to the caster wheel of a plow whereby, when the plow is in operative or plowing position, the caster wheel is held against castering, while, when in raised position, castering to a limited extent is permitted for turning.

Another object of the invention is to provide improved means permitting the caster wheel to float vertically when the plow bottoms are in operative position.

Further objects of the invention are: to provide means whereby the rear wheel may be so adjusted as to positively hold the landside of the plow away from the furrow wall, relieving the landside from sliding friction by carrying the side pressure on the rolling rear wheel; to provide means to permit the plow to be backed up in a straight line when the bottoms are lowered into plowing position or when raised to extreme height by operation of both power lift mechanism and depth lever; and to so control the rear wheel that it can in no case trip crosswise of the furrow and thereby block the plow or upset it when backing, as is often the case with spring controlled wheels.

With these and other objects in view, the invention comprises certain novel features of construction, combination and arrangement of parts as will be hereinafter more fully described and claimed.

In the drawings:

Figure 1 is a view in side elevation of a plow bottom and fragment of a beam with the lifting mechanism attached thereto.

Fig. 2 is a perspective view from the land side showing the plow in operative position.

Fig. 3 is a perspective view from the land side showing the plow raised and the wheel castered.

Fig. 4 is a detail transverse sectional view taken on line 4—4 of Fig. 1.

Like characters of reference designate corresponding parts throughout the several views.

The improved lifting mechanism which forms the subject-matter of this application is adapted to be attached to a plow of any approved type, preferably, though not necessarily, a tractor plow, the beam of a conventional plow being shown at 10. To the beam 10, just above the moldboard 11, a plate 12 is attached upon either side, in the drawing shown as the land side, with straps 13 and 14 attached to the furrow side, and secured to the beam in any approved manner as by the bolts 15.

The plate 12 upon the one side and the straps 13 and 14 upon the other side extend backwardly and clamp therebetween the sleeve 16 in which is slidably and rotatably mounted the caster spindle 17, carrying the caster wheel 18 of substantially the usual and ordinary type, no part of the present invention residing in the specific caster wheel.

One of the straps, as 13, extends rearwardly beyond the sleeve 18 and accommodates a fulcrum 19 for the bell-crank lever 20, one leg of which is attached to the link 21 by which power of any kind is applied to lift the plow bottoms, and the other leg attached to the link 22 which is provided with a loop 23 bearing against the collar 24 adjustably secured on the spindle 17.

It is obvious that by moving the link 21, the bell-crank lever 20 will move the link 22, and by bearing against the collar 24 will serve to force the caster wheel downwardly relative to the plow, and as the caster wheel rests upon the ground the result is the raising of the plow instead of the depressing of the caster wheel.

At its upper end the spindle 17 is provided with a curved arm 25 clamped thereon, extending forwardly between the curved guides 26 and 27. The guides 26 and 27 are secured at their lower ends to the plate 12 and strap 13 in any approved manner as by the bolts 28, 29, and 30. At their upper ends the guides are secured together in any approved manner as by a bolt 31 with a spacer 32 employed to maintain the upper ends of such guides in substantially parallel spaced relation, as shown more particularly at Fig. 4, forming a neck or constriction 33 at the top and a similar constriction 34 at the bottom.

The proportion and relation of the parts are such that when the plow is in lowered or operative position, the forward extremity of the arm 25 is positioned in the neck 33, thereby holding the spindle 17 and caster wheel 18 substantially rigid against rotation upon such spindle; but when the plow has been raised to the position shown at Fig. 3 the arm 25 is positioned between the widened portions of the guides 26 and 27, as shown more particularly at such figure and Fig. 4, whereby the wheel 18 is free to caster upon the spindle 17 within the limit of such guide members. In other words, when the plow is in operative position and plowing, or for backing up, the caster wheel is held rigidly against castering, while when raised at the end of the furrow or for other purposes the wheel 18 may caster to a sufficient extent to provide for all turning and like maneuvering. The length of the neck 33 is such also as to permit a limited floating of the plow relative to the caster wheel 18.

If with the plow at raised position as shown in Fig. 3, the operator should wish to back straight to the rear, the rear wheel may again be caused to lock against castering by causing the plow to be raised farther by manipulation of the hand lever so as to cause arm 25 to be moved down into constriction 34 and thereby cause the plow to back straight and high above all weeds, trash and obstructions.

What is claimed as new is:—

1. The combination with a plow beam, of a caster spindle mounted vertically slidable and rotatable relative thereto, means for raising and lowering the plow relative to the spindle, guide means engaging the spindle when the plow is in lowered position to prevent rotation of the spindle, and having a divergent throat permitting the castering of the spindle when the plow is in raised position.

2. The combination with a plow embodying a beam, of a caster spindle carried thereby and vertically slidable and rotatable relative thereto, means to raise and lower the plow relative to the caster spindle, guides carried by the plow spaced apart at varying distances, and an arm carried by the spindle introduced between the guides so proportioned that when the plow is in lowered position the arm is positioned between the narrower portion of the guides and when in a raised relation is positioned between the wider portion of the guides.

3. The combination of a plow beam, a sleeve rigidly connected therewith and spaced therefrom, a caster spindle mounted in the sleeve and adapted to rotate relative thereto and slide vertically therein, means to raise and lower the plow relative to the caster spindle, guides carried by the beam and spaced apart, the interval of spacing being greater midway of such guides, and an arm carried by said spindle introduced between said guides so positioned that when the plow is in lowered position the arm is retained within the narrower interval between the guides and when in a relatively raised position is retained within the wider interval of said guides.

4. The combination of a plow beam, a sleeve rigidly secured to and spaced rearwardly from said beam, a caster spindle mounted in said sleeve and free to rotate and slide vertically, guides secured to said beam and spaced apart, each of said guides embodying a rod curved outwardly adjacent its middle portion, and an arm secured to the spindle extending into the interval between the guides, all being so proportioned that when the plow is in lowered position the arm is embraced in the narrower interval between the guides and when in a relatively raised position is embraced within the wider interval between said guides.

5. A plow embodying a plow beam and its bottoms, a caster wheel and its spindle, said spindle slidably and rotatively connected to the plow beam, means for raising the plow relative to the wheel and spindle, and fixed guide means for permitting the swinging of the spindle and wheel in their intermediate position on the beam, and for locking them in the extreme positions.

6. A plow embodying a plow beam and its bottoms, a caster wheel and its spindle, said spindle slidably and rotatively connected to the plow beam, means for raising the plow relative to the wheel and spindle, and fixed guide means including bowed opposed bars for locking the spindle against turning when in relatively raised position and for permitting it to turn when slid to a given position.

7. A plow embodying a plow beam and its bottoms, a caster wheel and its spindle, said spindle slidably and rotatively connected to the plow beam, means for raising the plow relative to the wheel and spindle, and a fixed guide for locking the spindle against turning when in its lowest or highest position and for permitting it to rotate or swing the wheel when in an intermediate position.

8. The combination with a plow embodying a beam, of a caster spindle carried thereby and vertically slidable and rotatable relative thereto and having a radial part, means to raise and lower the plow relative to the caster spindle, and guides on the plow engaged by said part connected to the spindle, so designed that when the spindle is in its lowermost and uppermost positions it is locked against rotation and is permitted to rotate when in an intermediate position.

9. A plow embodying a plow beam and its bottoms, a caster wheel and its spindle, a lever on the spindle, means for raising the plow relative to the wheel and spindle, and a cam engaging the lever for locking the spindle in its upper or lower position and permitting it to swing when intermediate thereof.

In testimony whereof we affix our signatures.

JOHN H. BERRYHILL.
FREDERICK E. HAND.
LESLIE A. THOMAS.